(12) United States Patent
Wieczorek et al.

(10) Patent No.: US 11,358,470 B2
(45) Date of Patent: Jun. 14, 2022

(54) METHOD FOR OPERATING A DISPLAY APPARATUS FOR A MOTOR VEHICLE, AND MOTOR VEHICLE

(71) Applicant: SMR Patents S.à.r.l., Luxembourg (LU)

(72) Inventors: Romeo Wieczorek, Stuttgart (DE); Stefanie Göttlicher, Bruchköbel (DE); Ilka Rötzer, Denkendorf (DE)

(73) Assignee: SMR Patents S.à.r.l., Luxembourg (LU)

( * ) Notice: Subject to any disclaimer, the term of this patent is extended or adjusted under 35 U.S.C. 154(b) by 322 days.

(21) Appl. No.: 16/624,499

(22) PCT Filed: Jun. 20, 2018

(86) PCT No.: PCT/EP2018/066469
§ 371 (c)(1),
(2) Date: Dec. 19, 2019

(87) PCT Pub. No.: WO2018/234403
PCT Pub. Date: Dec. 27, 2018

(65) Prior Publication Data
US 2020/0171950 A1    Jun. 4, 2020

(30) Foreign Application Priority Data

Jun. 21, 2017   (DE) .................... 10 2017 113 781.5

(51) Int. Cl.
*B60K 35/00* (2006.01)
*B60N 2/90* (2018.01)
*B60N 2/02* (2006.01)

(52) U.S. Cl.
CPC ............ *B60K 35/00* (2013.01); *B60N 2/0244* (2013.01); *B60N 2/90* (2018.02);
(Continued)

(58) Field of Classification Search
CPC .............. B60K 35/00; B60K 2370/149; B60K 2370/21; B60K 2370/334; B60K 2370/52;
(Continued)

(56) References Cited

U.S. PATENT DOCUMENTS 4,625,329 A * 11/1986 Ishikawa ................... B60R 1/07
180/271
5,729,619 A *  3/1998 Puma ..................... B60K 28/063
382/115
(Continued)

FOREIGN PATENT DOCUMENTS

DE    102005020260 A1    4/2006
DE    102007005028 A1    8/2008
(Continued)

OTHER PUBLICATIONS

International Search Report dated Oct. 12, 2018 of International application No. PCT/US2018/066469.
(Continued)

*Primary Examiner* — Richard M Camby
(74) *Attorney, Agent, or Firm* — Jones Day

(57) ABSTRACT

A method for operating a display device for a motor vehicle, in particular for an autonomously or partially autonomously operable motor vehicle, which includes a plurality of display areas, wherein a display area is selected from the plurality of display areas on the basis of a configuration of the motor vehicle that is adjustable by a driver of the motor vehicle. A motor vehicle includes a control device for implementing such a method.

10 Claims, 3 Drawing Sheets

(52) U.S. Cl.
CPC .... *B60K 2370/149* (2019.05); *B60K 2370/21* (2019.05); *B60K 2370/334* (2019.05); *B60K 2370/52* (2019.05); *B60K 2370/736* (2019.05); *B60N 2002/0272* (2013.01); *B60N 2002/981* (2018.02)

(58) Field of Classification Search
CPC ........ B60K 2370/736; B60K 2370/771; B60N 2/0244; B60N 2/90; B60N 2002/0272; B60N 2002/981; B60N 2/143
See application file for complete search history.

(56) References Cited

U.S. PATENT DOCUMENTS

| | | | | |
|---|---|---|---|---|
| 7,126,583 | B1 * | 10/2006 | Breed | B60K 35/00 345/158 |
| 2003/0112132 | A1 * | 6/2003 | Trajkovic | B60K 35/00 340/435 |
| 2003/0209893 | A1 * | 11/2003 | Breed | B60N 2/0248 280/735 |
| 2004/0130442 | A1 * | 7/2004 | Breed | G02B 27/01 340/443 |
| 2007/0057781 | A1 * | 3/2007 | Breed | H01Q 1/3233 340/457.1 |

FOREIGN PATENT DOCUMENTS

| | | |
|---|---|---|
| DE | 102010052409 A1 | 5/2012 |
| DE | 112014006597 T5 | 4/2017 |
| EP | 1918892 A1 | 5/2008 |

OTHER PUBLICATIONS

Written Opinion dated Oct. 12, 2018 of International application No. PCT/US2018/066469.

\* cited by examiner

METHOD FOR OPERATING A DISPLAY APPARATUS FOR A MOTOR VEHICLE, AND MOTOR VEHICLE

BACKGROUND

1. Field of the Invention

The present disclosure relates to a method for operating a display device for a motor vehicle, in particular for an autonomously or partially autonomously operable motor vehicle, and a motor vehicle with a control device designed to implement such a method.

2. Related Art

The autonomous or partially autonomous control of the motor vehicle is increasingly being used, wherein in edge cases, interventions by the driver in the driving operation are no longer required. In such a motor vehicle, it is no longer mandatory that the driver of the motor vehicle adopts the usual sitting position facing forwards. It is certainly feasible that in fully autonomous mode of such a motor vehicle, the driver leans their seat back into a resting position, for example, or, by turning their seat, adopts a position in which their view is directed towards the passengers on a rear seat of the motor vehicle, in order to thus create a seating group or similar.

Even if no further direct interventions of any nature by the driver in the driving operation are required, it is desirable, however, if in such a situation the driver or other passengers of the motor vehicle have access to information about the current driving status. With a sitting position in which the view of the driver is no longer directly pointing in the direction of driving, the problem can also arise that due to contradictory information with regard to the visual perception of the driver and their sense of balance, they feel unwell or nauseous. It is also desirable if such a situation can be remedied.

A method is known from DE 10 2007 005 208 A1 in which information can be displayed on different projection surfaces of the motor vehicle. Here, a selection can be made from several possible projection surfaces, which can for example be made on the basis of the detection of a direction of view of the driver.

SUMMARY

In an aspect, a generic method is further developed so that, in particular in partially autonomous or autonomous mode of the motor vehicle, the information transfer to the driver and their driving comfort are improved.

With such a method for operating a display device for a motor vehicle, in particular for an autonomously or partially autonomously operable motor vehicle, which includes a plurality of display areas, a display area is selected from the plurality of display areas on the basis of a configuration of the motor vehicle that is adjustable by a driver of the motor vehicle. This is preferably a real-time application.

In other words, with the method according to an aspect of the invention, no active input by the driver is required in order to select the optimum display area for the respective configuration of the motor vehicle. This ensures that the driver can be presented with the necessary information at any point in time, and that the driver is provided with a display that optimizes their driving comfort. If the display area is selected solely on the basis of the configuration of the motor vehicle, display configurations can also be avoided that due to an incorrect entry by the driver would lead to a non-optimal display.

In a preferred embodiment, the configuration of the motor vehicle is a seating configuration. This can in particular be a configuration of the seat backrest or a rotation of the sitting direction. This makes it possible to select the display area in a particularly simple manner, wherein on the basis of the seating configuration, an anticipated direction of view of the driver is automatically taken into account.

It is further preferred when during the adjustment of the leaned back seating configuration—in other words, a resting or relaxation position—a display area is selected that is arranged in the headliner of the motor vehicle. In the headliner especially, a large surface is available that is otherwise not used, which can be selected for the display of the desired information. Thus, during autonomous operation of the motor vehicle, the driver can relax and still receive all the necessary information.

Here, it is particularly preferred when during the adjustment of a leaned back seating configuration, a video signal recorded by a front camera of the motor vehicle and/or a headup display signal and/or a video signal recorded by a rear view camera is shown on the display area arranged in the headliner. Thus, the driver receives all the desired information on the driving status of the motor vehicle and its surrounding area on the one hand, wherein on the other, this is also presented in such a manner that conflicts between the visual perception of the vehicle passengers and the driver and their sense of balance and movement are avoided. As a result, the occurrence of nausea or similar can reliably be avoided.

In a further preferred embodiment, after the display area is selected, it is monitored whether a contact-free control signal of the driver is present and a signal displayed on the selected display area is selected depending on the contact-free control signal. As a result, advantageously, the display can be freely configured according to the wishes of the driver.

Here it is preferred when the contact-free control signal includes a gesture and/or a direction of view and/or a head position and/or a body position of the driver. The selection of the desired display and desired display signal can thus be made in a particularly simple manner and with a high degree of comfort for the driver. Gestures here mean not only gestures of the extremities and hands of the driver but can also include facial expressions. Here, it is certainly possible that by briefly shutting the eyes, for example, a control signal is emitted which triggers a corresponding reaction.

It is further preferred that the displayed signal is a signal from an entertainment device, an Internet access device, a telecommunications device and/or a background image and/or a background video. This enables a free configuration of the display, so that this can be adapted at any time to the wishes and preferences of the driver.

In addition, the condition of the driver is recorded, which can be achieved by at least one sensor, which can also record a contact-free control signal that is actively entered by the driver. The driver condition, such as fatigue or even their state of health, can here be determined by a gesture, a direction of view, a head position, a body position, body posture, a pupil, in particular the size of the pupil, a brain activity, a pulse, a temperature, production of sweat and/or an odour of the driver. The control signal then preferably serves to issue a warning message, in particular on the display device and/or the adjustment of the configuration of the motor vehicle, in particular of the driver's seat. If, for example, it is recorded that the driver is tired, an automatic switch can be made from the upright seating configuration to the leaned back seating configuration.

In a further preferred embodiment, the display is shown via projection using a video projector and/or via display on a flexible monitor and/or a form-adapted monitor. In particular in the case of the display on the headliner, this enables the seamless integration of the display area into the interior design of the motor vehicle, so that the display area, in particular when in an inactive state, is not recognizable as such and there is no negative impact on the aesthetic appearance.

In a further preferred embodiment, when there is a change of the configuration that is adjustable by the driver, in particular when adopting an upright sitting position, the selected display area is deactivated. This ensures that the display is not operated unnecessarily when it is located outside the direction of view of the driver.

In another aspect, a motor vehicle includes a display device with a plurality of display areas and a control device, which is designed to implement a method as described.

BRIEF DESCRIPTION OF THE DRAWINGS

Preferred embodiments of the present disclosure will be explained in greater detail below with reference to the drawings as an example, in which.

DETAILED DESCRIPTION

Figure 1:
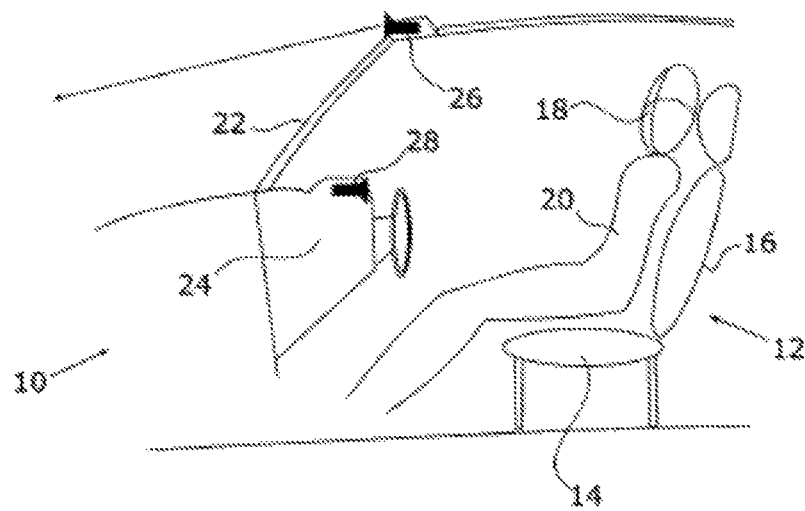
FIG. 1 shows a schematic depiction of a motor vehicle designed to implement an exemplary embodiment of the method, wherein the driver's seat is in a normal driving position.

It is to be understood that the disclosure is not limited in its application to the details of construction and to the arrangements of the components set forth in the following description or illustrated in the drawings. The Figures and written description are provided to teach those skilled in the art to make and use the inventions for which patent protection is sought. The disclosure is capable of other embodiments and of being practiced and carried out in various ways. Those skilled in the art will appreciate that not all features of a commercial embodiment are shown for the sake of clarity and understanding.

In addition, it is to be understood that the phraseology and terminology employed herein are for the purpose of describing the present disclosure and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity in specific reference to the Figures and are not intended to limit the scope of the present disclosure. Further, it should be understood that any one of the features may be used separately or in combination with other features. Other systems, methods, features, and advantages will be or become apparent to those skilled in the art upon examination of the Figures and the description. The term "driver" is used throughout this disclosure but is not limited to a person who is operating or controlling the vehicle; it may refer to any vehicle occupant, person, passenger, or user inside the vehicle, or, in certain circumstances, a person who is outside the vehicle but controlling the vehicle or interested in movement of the vehicle. It is intended that all such additional systems, methods, features, and advantages be included within this description, and be within the scope of the present disclosure.

A motor vehicle, which in its entirety is designated by reference numeral 10, includes a driver's seat 12 with a seat surface 14 and a backrest 16. The backrest 16 is adjustable in terms of its inclination in relation to the seat surface 14. The seat 12 can here also be rotated in its entirety, for example, in order to enable the driver to turn to face the passengers seated at the back of the motor vehicle 10 during autonomous operation of the motor vehicle 10. In the upright sitting position shown in FIG. 1, a head 18 of the driver 20 is directed towards a windscreen 22 of the motor vehicle 10, so that the driver can perceive the traffic situation. Further information, such as the speed of the motor vehicle 10, a map display or similar can be displayed on a dashboard 24 or via projection onto a headup display on the windscreen 22. The motor vehicle 10 further includes a front view camera 26, which can record the traffic situation in front of the motor vehicle, and a camera 28 pointing inward, with which contact-free inputs by the driver 20 can be recorded, for example.

Figure 2:
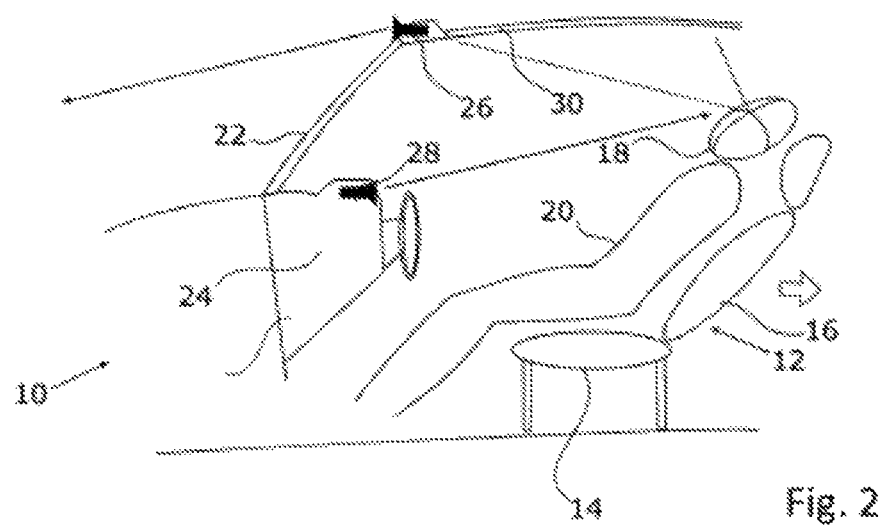
FIG. 2 shows a schematic view of the motor vehicle according to FIG. 1, in which the driver's seat has been moved into a resting position.

If, during autonomous operation of the motor vehicle 10 or when the motor vehicle 10 is at a standstill, the driver 20 readjusts the backrest 16 of the driver's seat 12 into the leaned back resting position shown in FIG. 2, this is recorded by corresponding sensors in the driver's seat 12. In order to enable the driver 20 to also have a view in this position onto the traffic situation on the front side, a signal from the front image camera 26 is now shown on a headliner 30 of the motor vehicle 10. This can be shown using a video projector; alternatively, the headliner 30 can also be designed as a flexible or form-adapted monitor, partially or over its entire surface.

This makes it possible that in the resting position also shown in FIG. 2 the driver 20 can also view the traffic situation, so that their attention is not negatively impacted and if applicable, travel sickness due to a discrepancy between their visual perception and their perception of speed and acceleration is avoided.

In addition to the signal from the front image camera 26, further information can also be shown on the headliner 30, such as the image of a headup display or also signals from additional cameras, such as a rear view camera.

If the driver 20 does not wish to have this display, it is possible for them to change the display mode and the signal shown on the headliner 30 via contact-free inputs, which can for example be recorded by the camera 28. For example, as an alternative to the signal from the front image camera 26, a signal from an entertainment system, a signal from a telecommunications system, such as email or SMS, or an operating interface for a telephone system or similar can be shown. If the driver does not wish to receive distracting displays or displays showing unnecessary information on the headliner 30, a background image or a background video, such as the image of a starry sky, can be shown. It is further possible for the driver 20 to move the display of an additional display apparatus, such as a monitor in the dashboard 24, onto the headliner 30.

Figure 3:
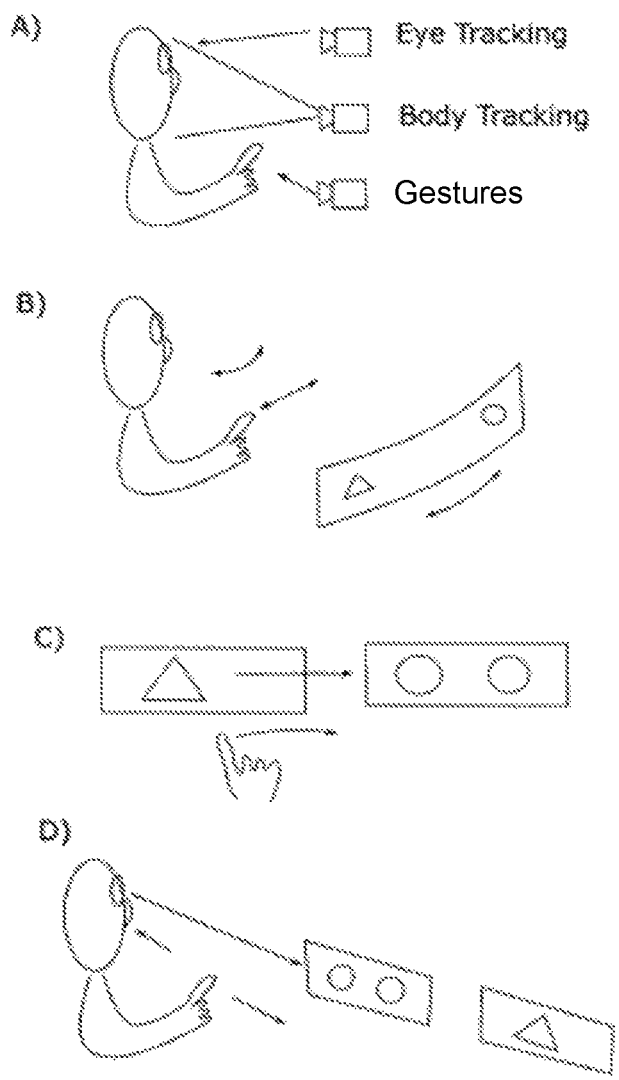
FIGS. 3A, 3B, 3C, and 3D show a schematic depiction of possible control inputs that do not require contact for an exemplary embodiment of a method.

Examples of possible contact-free inputs are summarized in FIG. 3. For example, as shown in FIG. 3A, gestures of the extremities of the driver 20 can be recorded by the camera 28. A recording of their entire body posture or iris position and/or direction of view is also possible. Here, it is also possible to record whether the eyes of the driver 20 are open or closed, which can also be used as a control signal for the display on the headliner 30.

FIG. 3B illustrates how through eye movements or hand movements of the driver 20, different display modes can be selected on the projection surface, in this case, the headliner 30. FIGS. 3C and 3D illustrate how the display of an additional display area can be transferred onto the display in the headliner 30 by gesture control . This can be achieved through simple virtual "movement" of the display by means of a corresponding gesture.

Figure 4:
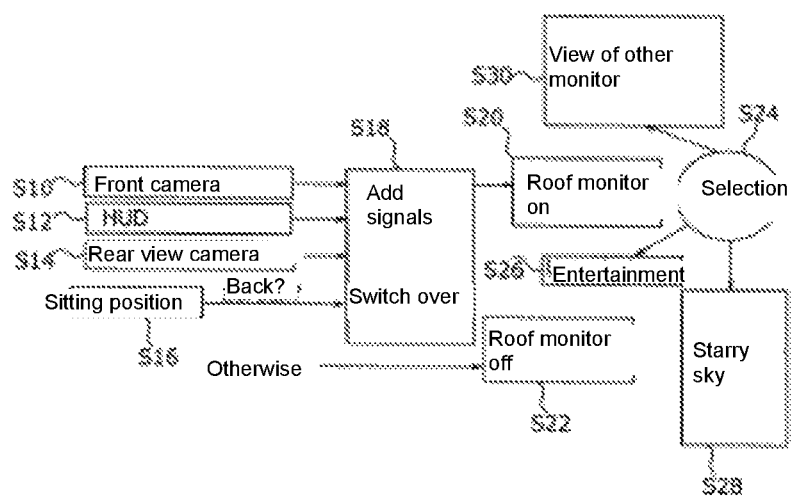
FIG. 4 shows a schematic flow diagram for an exemplary embodiment of a method.

FIG. 4 shows a control diagram for a control appliance for implementing the method. In one method step S10, signals from the front view camera 26 are here first recorded. At the same time, in one method step S12, headup display information is generated and in a further method step S14, the signals from an interior rear view camera are recorded. In addition, in one method step S16, information about the sitting position is recorded. In step S18, the recorded signals from the front view camera and the rear view camera, and the generated signal for the headup display are summarized, wherein depending on the recorded sitting position, the display area is changed. If the driver 20 moves their seat into the resting position shown in FIG. 2, in step S20, the headliner 30 is selected as the display area. If the driver 20 moves the sitting position back into the upright position shown in FIG. 1, in step S22, the display on the headliner 30 is deactivated again.

In a further step S24, the recording of additional contact-free inputs by the driver 20, as already described above, is made as summarized in FIG. 3. Depending on the type of contact-free input by the driver 20, in a further step S26, the display is then changed to an entertainment system, in step 28 a background image, such as a starry sky, is shown or in step S30 the display of an additional screen is moved onto the headliner 30. Naturally, in additional method steps, which are not shown in detail, further display modes can be selected, as has already been described above.

Overall, therefore, the display mode of the motor vehicle 10 can always be adapted with a minimum of active inputs to the current configuration of the motor vehicle 10 and to the needs of the driver 20.

The features of the invention disclosed in the above description, in the drawings and in the claims can be essential both individually and in any combination required for the realization of the invention in its different embodiments.

LIST OF REFERENCE NUMERALS

10 Motor vehicle
12 Driver's seat
14 Seat surface
16 Backrest
18 Head
20 Driver
22 Windscreen
24 Dashboard
26 Front view camera
28 Camera
30 Headliner
S10-S30 Method steps

What is claimed is:

1. A method of operating a display device for a motor vehicle or an autonomous or partially autonomous motor vehicle, comprising:
    selecting a display area from a plurality of display areas based on a configuration of the motor vehicle, the configuration being determined by at least one of a position, an orientation, and at least one movement of a driver of the vehicle, the display areas being configured to avoid conflicts between a visual perception and a sense of balance and movement of the driver,
    monitoring a condition of the driver and taking into account when a control signal is produced for the display device, the control signal being determined by at least one of a gesture, a direction of view, a head position, a body position, a body posture, a pupil, a size of the pupil, a brain activity, a pulse, a temperature, a production of sweat, or an odor of the driver,
    after the display area is selected, monitoring whether a control signal entered in a contact-free manner by the driver is present and selecting a signal displayed on the selected display area depending on the contact-free control signal,
    monitoring changes in the configuration, and
    deactivating the selected display area based on a determination that there is a change in the configuration or that the driver has adopted an upright sitting position.

2. The method according to claim 1, wherein the configuration is further determined by one or more of a seating configuration, a position of a backrest, or a position of a seat surface of a driver's seat.

3. The method according to claim 2, further comprising selecting a display area arranged in a headliner of the motor vehicle during an adjustment of a leaned back seating configuration.

4. The method according to claim 3, further comprising showing at least one of a video signal recorded by a front camera of the motor vehicle, a headup display signal, or a video signal recorded by a rear view camera on the display area arranged in the headliner during an adjustment of a leaned back seating configuration.

5. The method according to claim 1, wherein the control signal at least one of issues a warning message on the display device or automatically alters or adjusts the configuration of the motor vehicle or the driver's seat.

6. The method according to claim 1, wherein the displayed signal is selected as a signal from at least one of an entertainment device, an internet access device, a telecommunications device, a background image, or a background video.

7. The method according to claim 1, wherein the display is shown via at least one of projection using a video projector, display on a flexible monitor, or display on a form-adapted monitor.

8. A motor vehicle, comprising:
    a seat for a driver;
    a display device with a plurality of display areas; and
    a control device configured to implement the method according to claim 1.

9. The motor vehicle according to claim 8, wherein a headliner of the motor vehicle is equipped with a monitor.

10. The motor vehicle according to claim 8, further comprising at least one sensor or at least one camera for recording a control signal.

* * * * *